(12) United States Patent
Orla-Jensen et al.

(10) Patent No.: US 10,661,285 B2
(45) Date of Patent: May 26, 2020

(54) SYSTEMS AND METHODS FOR APPLYING A LIQUID COATING TO A SUBSTRATE

(71) Applicant: NORDSON CORPORATION, Westlake, OH (US)

(72) Inventors: Per Orla-Jensen, San Marcos, CA (US); Patrick T. Hogan, San Marcos, CA (US); Gregory L. Hartmeier, San Diego, CA (US); Kenneth S. Espenschied, Olmsted Township, OH (US)

(73) Assignee: Nordson Corporation, Westlake, OH (US)

( * ) Notice: Subject to any disclaimer, the term of this patent is extended or adjusted under 35 U.S.C. 154(b) by 202 days.

(21) Appl. No.: 15/784,164

(22) Filed: Oct. 15, 2017

(65) Prior Publication Data

US 2018/0036747 A1 Feb. 8, 2018

Related U.S. Application Data

(63) Continuation of application No. 15/186,926, filed on Jun. 20, 2016, now Pat. No. 9,789,497.

(51) Int. Cl.
*B05B 1/30* (2006.01)
*B05C 11/10* (2006.01)
(Continued)

(52) U.S. Cl.
CPC .............. *B05B 1/30* (2013.01); *B05C 11/101* (2013.01); *B05C 11/1007* (2013.01);
(Continued)

(58) Field of Classification Search
None
See application file for complete search history.

(56) References Cited

U.S. PATENT DOCUMENTS

| 7,028,867 B2 | 4/2006 | Acum et al. |
| 9,636,701 B2 | 5/2017 | Abernathy et al. |

(Continued)

FOREIGN PATENT DOCUMENTS

| EP | 1958705 A2 | 8/2008 |
| EP | 2202005 A1 | 6/2010 |
| WO | 2017/079366 A1 | 5/2017 |

OTHER PUBLICATIONS

(IPEA/409) International Preliminary Report on Patentability Chapter II or (IB/373) International Preliminary Report on Patentability Chapter I dated Jan. 3, 2019 for WO Application No. PCT/US17/035678.

*Primary Examiner* — Nathan T Leong
(74) *Attorney, Agent, or Firm* — Baker & Hostetler LLP (57) ABSTRACT

System and methods for calibrating a coating system are disclosed. Initially, a material is dispensed using an applicator of the coating system for a predetermined time period. A characteristic of the dispensing of the material for the predetermined time period is then determined. The characteristic of the dispensing of the material is compared to a predetermined range and it is determined that the characteristic of the dispensing of the material is outside of the predetermined range. In response, a velocity of the applicator, a pulse rate of the applicator, a temperature of the material, a pressure of the material supplied to the applicator, or a fan width of the applicator is adjusted to change the characteristic of the dispensing of the material.

18 Claims, 6 Drawing Sheets

(51) Int. Cl.
*G01F 9/00* (2006.01)
*B05C 5/02* (2006.01)
*G01F 25/00* (2006.01)

(52) U.S. Cl.
CPC ...... *B05C 11/1013* (2013.01); *B05C 11/1034* (2013.01); *G01F 9/003* (2013.01); *B05C 5/022* (2013.01); *G01F 25/0046* (2013.01)

(56) References Cited

U.S. PATENT DOCUMENTS

2009/0104343 A1* 4/2009 Espenschied ......... B05B 12/085
427/9
2016/0005668 A1 1/2016 Donner et al.

* cited by examiner

SYSTEMS AND METHODS FOR APPLYING A LIQUID COATING TO A SUBSTRATE

CROSS REFERENCE TO RELATED APPLICATIONS

This application is a continuation of U.S. patent application Ser. No. 15/186,926, filed Jun. 20, 2016, the disclosure of which is hereby incorporated by reference herein.

TECHNICAL FIELD

The present disclosure relates generally to dispensing liquid coating materials and, more particularly, to systems and methods for applying liquid coating material, such as a conformal coating material, to a substrate, such as a circuit board.

BACKGROUND

Many industrial applications require the use of discrete, well-defined and uniform coatings applied to predetermined areas. Such coatings are very useful in varied processes, such as conformal coatings on non-uniform or irregular substrates like electronic circuit boards. In the production of discrete coatings for application to discrete substrate areas, for example, it is desirable to obtain broad, uniform coatings in a non-contact application process with sharp, square, cut-on and cut-off edges with no stringing of material. In particular, conformal coating material is used to protect selected components of a circuit board from moisture, dirt, etc.

A satisfactory coating of a substrate with a material includes both the adequate coverage of the material on the surface of the substrate and the application of the material in a desired amount (e.g., thickness). The two goals are often at odds, since an adjustment made to a parameter of a coating material dispensing system to affect one goal may negatively impact the other goal. For instance, if the pressure of the material supplied to the applicator is raised to increase the width of the fan of material dispensed from the applicator, this may cause the thickness of the material being applied to the substrate to fall to an unacceptable level. Therefore, there is a need for improved systems and methods for applying coating materials to a substrate that account for both the coverage of the material and the amount of material applied.

SUMMARY

Disclosed herein are systems and methods for applying a liquid coating to a substrate. In one embodiment, a method of applying a material to a substrate includes coating a first substrate with the material using an applicator. A first total amount of the material applied to the first substrate may be determined and compared to a first predetermined control range. It may be determined that the first total amount of the material applied to the first substrate is outside of the first predetermined control range. A velocity of the applicator, a pulse rate of the applicator, or a temperate of the material may be adjusted by a first adjustment amount to change a total amount of material applied to a subsequent, second substrate. The method may further include coating a second substrate with the material using the applicator. A second total amount of material applied to the second substrate may be determined and compared to the first predetermined control range. It may be determined that the second total amount of the material applied to the second substrate is outside the first predetermined control range. The velocity of the applicator, the pulse rate of the applicator, or the temperature of the material may be adjusted by a second adjustment amount to change a total amount of material applied to a subsequent substrate. The first adjustment amount and the second adjustment amount may be summed to determine a total adjustment amount. The total adjustment amount may be compared to a predetermined threshold. It may be determined that the total adjustment amount is greater than the predetermined threshold. Responsive to the determination that the total adjustment amount is greater than the predetermined threshold, a pressure of the material supplied to the applicator or the fan width of the applicator may be adjusted.

In another embodiment, a method of applying a material to a substrate may include coating a first substrate with the material using an applicator. A first total amount of the material applied to the first substrate may be determined and compared to a first predetermined control range. It may be determined that the first total amount of the material applied to the first substrate is outside of the first predetermined control range. A pressure of the material supplied to the applicator or a fan width of the applicator may be adjusted by a first adjustment amount to change a total amount of material applied to a subsequent, second substrate. The method may further include coating the second substrate with the material using the applicator. A second total amount of the material applied to the second substrate may be determined and compared to the first predetermined control range. It may be determined that the second total amount of the material applied to the second substrate is outside of the first predetermined control range. The pressure of the material supplied to the applicator or the fan width of the applicator may be adjusted by a second adjustment amount to change a total amount of material applied to a subsequent substrate. The first adjustment amount and the second adjustment amount may be summed to determine a total adjustment amount. The total adjustment amount may be compared to a predetermined threshold. It may be determined that the total adjustment amount is greater than the predetermined threshold. Responsive to the determination that the total adjustment amount is greater than the predetermined threshold, a velocity of the applicator, a pulse rate of the applicator, or a temperature of the material may be adjusted.

In another embodiment, a method of applying a material to a substrate may include coating a first substrate with the material using an applicator. A first total amount of the material applied to the first substrate may be determined and compared to a first predetermined control range. It may be determined that the first total amount of the material applied to the first substrate is outside of the first predetermined control range. A velocity of the applicator, a pulse rate of the applicator, or a temperature of the material may be adjusted by a first adjustment amount. A pressure of the material supplied to the applicator or a fan width of the applicator may be adjusted by a second adjustment amount. The adjustments corresponding to the first and second adjustments may change a total amount of material applied to a subsequent, second substrate. The method may further include coating the second substrate with the material using the applicator. A second total amount of the material applied to the second substrate may be determined and compared to the first predetermined control range. It may be determined that the second total amount of the material applied to the second substrate is within the first predetermined control range.

In yet another embodiment, a method of applying a material to a substrate may include dispensing the material using an applicator having a first velocity, a first pulse rate, a first temperature of the material, a first pressure of the material supplied to the applicator, and a first fan width. A first total amount of the material dispensed may be determined and compared to a first predetermined control range. It may be determined that the first total amount of the material is outside of the first predetermined control range. A pressure of the material supplied to the applicator or a fan width of the applicator may be adjusted to change a total amount of material applied to a subsequent substrate. The method may further include dispensing the material from the applicator for a predetermined time period. A second total amount of the material dispensed may be determined and compared to a second predetermined control range. It may be determined that the second total amount of the material dispensed is outside of the second predetermined control range. Response to the determination that the second total amount of the material dispensed is outside the second predetermined control range, a velocity of the applicator, a pulse rate of the applicator, or a temperature of the material may be adjusted to change a total amount of material applied to a subsequent substrate.

In still another embodiment, a method of applying a material to a substrate may include dispensing a first material using an applicator having a first velocity, a first pulse rate, a first temperature of the material, a first pressure of the material supplied to the applicator, and a first fan width. A different, second material to be coated on a subsequent substrate may then be received. The second material may be dispensed from the applicator for a predetermined time period and a total amount of the second material dispensed may be determined. The total amount of the second material dispensed may be compared to a predetermined control range. In response, it may be determined that the total amount of the second material dispensed is outside of the predetermined control range. A velocity of the applicator, a pulse rate of the applicator, a temperature of the second material, a pressure of the second material supplied to the applicator, or a first fan width of the applicator may then be adjusted to change a total amount of second material applied to the subsequent, second substrate.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

Figure 1:
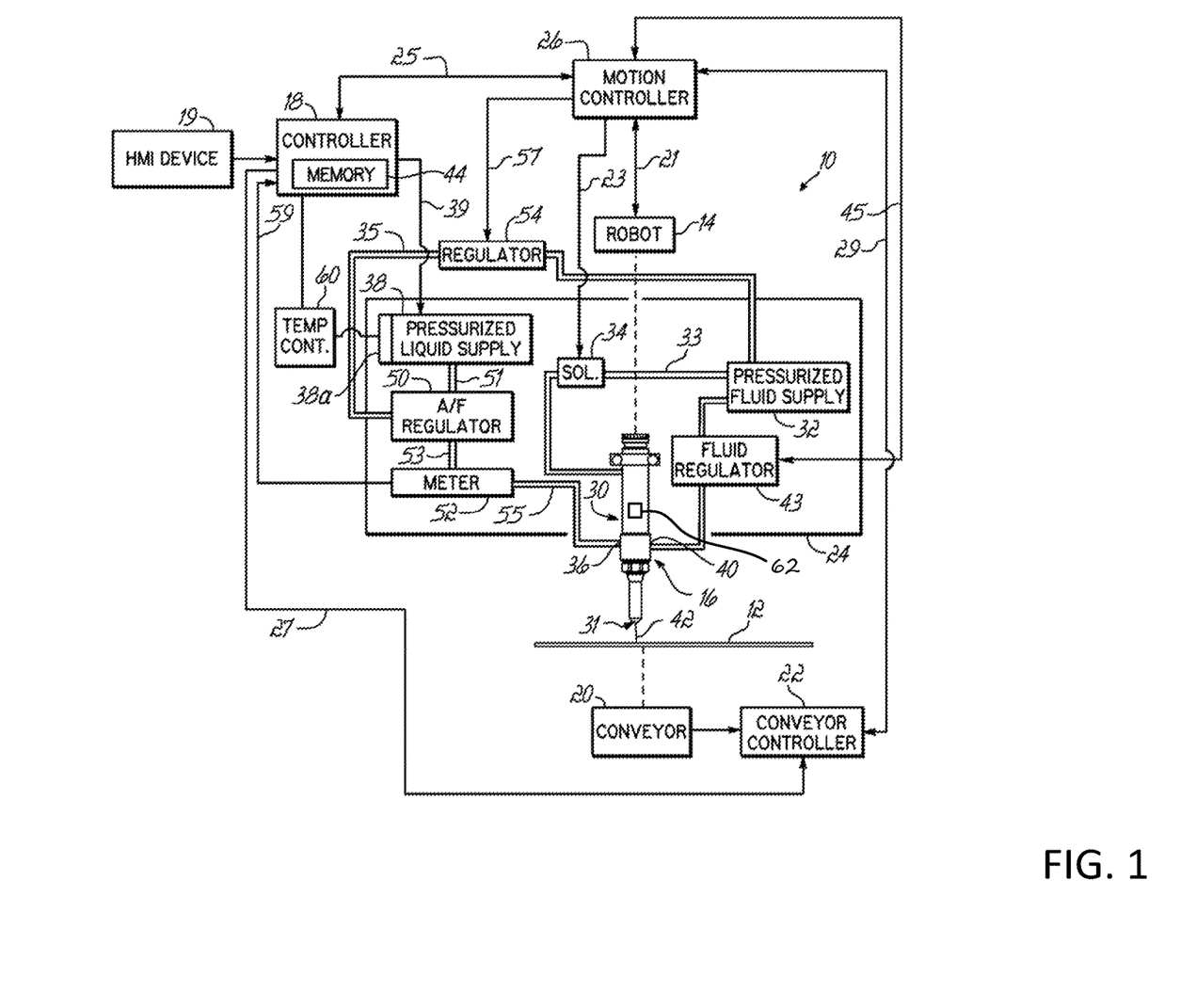
FIG. 1 illustrates a schematic view of a computer-controlled coating system in accordance with an embodiment.

With reference to FIG. 1, a coating system 10 may be used to apply a liquid coating material, such as a conformal coating material, to a series of substrates, such as the representative substrate 12. Although the operation of a representative coating system 10 will be described herein, those skilled in the art will appreciate that a wide variety of other coating systems may be used to complete the method described below. The coating system 10 may be, for example, a Model SC-105, SC-205, or SC-400 conformal coating applicator commercially available from Asymtek (Carlsbad, Calif.).

In the representative embodiment, the coating system 10 includes a multi-axis electro-mechanical positioner or robot 14 and a conformal coating applicator 16 coupled with the robot 14. For example, the applicator 16 may be suspended from the robot 14 above the substrates 12. In one embodiment, the robot 14 is adapted to move the applicator 16 in directions defined within an X-Y-Z Cartesian coordinate frame to supply three degrees of freedom. The robot 14 includes a drive coupled to independently controllable motors (not shown) in a known manner. The applicator 16 is manipulated by robot 14 relative to the substrate 12 for applying amounts of liquid coating material to selected areas of the substrate 12.

A programmable controller 18 coordinates the movements and actuations of the coating system 10. The controller 18 may be a programmable logic controller (PLC), a microprocessor based controller, personal computer, or another conventional control device capable of carrying out the functions described herein as understood by a person having ordinary skill in the art. For example, the controller 18 may perform the various flow control routines and fan width control routines described in detail below. A human machine interface (HMI) device 19 is operatively connected to the controller 18 in a known manner. The HMI device 19 may include input devices and controls, such as a keypad, pushbuttons, control knobs, a touch screen, etc., and output devices, such as displays and other visual indicators, that are used by an operator to control the operation of the controller 18 and, thereby, control the operation of the coating system 10. The HMI device 19 may further include an audio output device, such as a speaker, by which an audio alert may be communicated to an operator.

Substrates 12, for example, printed circuit boards with attached semiconductor die and other components, are supported in an operative relationship with the applicator 16 in a known manner and liquid coating material is applied from the applicator 16 onto selected areas on each substrate 12. Depending on the dispensing application, a series of substrates 12 may be coated in a batch mode. Alternatively, the substrates 12 may be continuously transported past the applicator 16 on an automatic conveyor 20. The conveyor 20 has a conventional design and, furthermore, may have a width that can be adjusted to accommodate substrates 12 of different dimensions. The conveyor 20, which may also include pneumatically operated lift and lock mechanisms (not shown), receives command signals from a conveyor controller 22.

The applicator 16 is electrically coupled with an applicator controller 24, which supplies command signals that control the operation of the applicator 16. A motion controller 26 is electrically coupled by a communication link 21 with the robot 14. The solenoid 34 is electrically coupled by a communication link 23 with the motion controller 26. The conveyor controller 22 and motion controller 26 are also electrically coupled with controller 18 over respective communication links 25, 27. The motion controller 26 is electrically coupled over a communication link 29 with the conveyor controller 22. Thus, a programmable control system for coating system 10 includes the controller 18, the applicator controller 24, the motion controller 26, and the optional conveyor controller 22 as interconnected components that communicate with each other.

The motion controller 26 supplies command signals to the robot 14 over the communication link 21. The command signals are used by the robot 14 to control the position and/or velocity of the applicator 16. Generally, the robot 14 includes electric motors, such as servo motors or stepper motors, that drive the motion of the different axes of the robot 14.

Applicator 16 includes a body 30 suspended from the robot 14, a nozzle 31 mounted to one end of the body 30, and a flow control mechanism (not shown) disposed inside the body 30. The flow control mechanism inside body 30 may comprise an air-actuated needle, an air piston, and a valve seat that cooperate to form a dispensing valve (not shown) operative to control a flow of conformal coating material dispensed from the applicator 16. A pressurized fluid supply 32 and a solenoid 34 cooperate to supply pressurized fluid in a known manner to regulate the actuation of the dispensing valve inside the body 30. Specifically, the solenoid 34 controls air pressure in a conduit 33 connecting the pressurized fluid supply 32 with the applicator 16 so as to move the air piston and, thereby, move the needle relative to the valve seat to provide an opened position for the dispensing valve in which liquid coating material is dispensed from the applicator 16 onto the substrate 12. The solenoid 34 may vent the air pressure acting on the air piston to permit the needle to return to a closed position in which the needle contacts the valve seat to discontinue the dispensing.

The coating system 10 may include a fan width sensor 62 that may be disposed, for example, on the robot 14 or the applicator 16. In some aspects, the fan width sensor 62 may also be a separate module independent from the robot 14 and the applicator 16. The fan width sensor 62 may be configured to determine various characteristics (e.g., width or shape) of the fan of the material dispensed from the applicator 16. As used herein, the fan of the material refers to the shape, and dimensions thereof, of the stream 42 of material from the applicator 16. For example, the applicator 16 may dispense the material in a conical spray at a known distance between the applicator 16 and the substrate 12, whereby the conical spray will produce a circular area of coating on the substrate 12 with a certain diameter. As the applicator 16 moves along the substrate 12, the conical spray of the material will produce a strip of coating on the substrate 12 having a width corresponding with the certain diameter of the conical spray. The fan width sensor 62 may be communicatively connected with the motion controller 26 and/or controller 18. For instance, the data points indicative of the fan of material and determined by the fan width sensor 62 may be communicated to the controller 18 and stored in the memory 44 therein.

In an aspect, the fan width sensor 62 may include a camera and a light or laser source, wherein the stream 42 of material may be positioned between the camera and the light or laser source to determine the various characteristics (e.g., width or shape) of the stream 42 of material. The camera may be configured to capture images of the fluid pattern of the stream 42 as it is dispensed from the applicator 16. The images captured by the camera may be still images or images that comprise a video stream. The camera may forward the images of the fluid pattern to the controller 18, which may use the images to perform other processing steps, such as a fan width control routine. The light or laser source may be configured to emit light or a laser through the fluid pattern of the stream 42. For example, the light or laser source may be located directly in front of the camera on the other side of the applicator 16 and on the same horizontal plane as the camera. The light or laser source may provide illumination of the fluid pattern of the stream 42 to improve image quality of the images captured by the camera. The fan width sensor 62 configured as such may allow the fan width or other characteristics of the stream 42 to be determined and, possibly, adjusted in real-time while a substrate is coated. The fan width sensor 62 configured with a camera and a light or laser source is fully described in International Patent App. No. PCT/US2016/060223, filed Nov. 2, 2016, and published as WO 2017/0079366 on May 11, 2017, which is incorporated herein by reference in its entirety.

The coating system 10 includes a pressurized liquid supply 38 that operates in a known manner under the command of controller 18 to generate a continuous stream or supply of the pressurized liquid coating material. For example, the pressurized liquid supply 38 may include a diaphragm or piston pump that siphons amounts of liquid coating material from a reservoir and then pumps the stream of liquid coating material under pressure from the reservoir through a fluid path to the applicator 16. The pressurized liquid supply 38 is electrically connected by a communication link 39 with the controller 18, which can regulate operating parameters such as the temperature and pressure of a liquid coating material by communicating appropriate control signals to the pressurized liquid supply 38 over communication link 39.

The pressurized liquid supply 38 is optionally configured with one or more conventional heating elements 38a that are electrically coupled with a conventional temperature controller 60 that is electrically coupled with the controller 18. The construction and operation of conventional heating elements, such as heating elements 38a, and temperature controllers, such as temperature controller 60, are understood by a person having ordinary skill in the art. In an alternative embodiment, the applicator 16 may include heating element (not shown) or a heating element (not shown) may be disposed in the one of the conduits 51, 53, 55. Regardless of the specific location of the heating element in the flow path between the pressurized liquid supply 38 and the nozzle 31, the liquid coating material may be heated in this flow path before being applied to the substrate 12.

The applicator 16 includes a liquid inlet 36 that is coupled in fluid communication with a pressurized liquid supply 38. The liquid coating material is supplied from the pressurized liquid supply 38 to the applicator 16 through the liquid inlet 36 for regulated dispensing out of a dispensing orifice (not shown) in the nozzle 31. The body 30 has a fluid inlet 40 coupled with pressurized fluid supply 32 and internal passageways (not shown) that direct the pressurized fluid to outlets in the vicinity of the dispensing orifice in nozzle 31, where the pressurized fluid is discharged to interact with and manipulate the stream 42 of liquid coating material that is sprayed from the applicator 16. A fluid regulator 43, which communicates over communication link 45 with motion controller 26, controls the flow of pressurized fluid from the pressurized fluid supply 32 to the fluid inlet 40. A representative applicator similar to applicator 16 is described in U.S.

Pat. No. 7,028,867, the disclosure of which is hereby incorporated by reference herein in its entirety.

The coating system 10 is operated as instructed by a library of operational cycles or sequences that are stored in a memory 44 associated with the controller 18 and/or stored in other computers. The operational sequences are recalled and placed in a particular operational program, as desired, executing on the controller 18. The operational sequences can be adjusted to accommodate different environmental conditions, different types of substrates 12, or different types of conformal coating material. During operation, the controller 18 can transfer an entire operational program as electrical signals over communication link 25 to the motion controller 26 for execution at the motion controller 26. Alternatively, the controller 18 can transfer one or more instructions as electrical signals over communication link 25 in a batch of instructions and data to the motion controller 26 for subsequent execution. The operator may enter parameters, such as the type of substrate 12, an identifier of substrate 12, a description of substrate 12, the type of liquid coating material, the liquid pressure, the assist air pressure, the velocity of the applicator 16, the distance between the substrate 12 and applicator 16, etc., at the HMI device 19. The entered parameters are stored in the memory 44 of controller 18 for future use in an operational sequence. Each substrate 12 is matched by the controller 18 with a coating program that determines which specific components and areas of the substrate 12 are to be coated with liquid coating material. Typically, the liquid coating material is applied to only selected areas and/or components on the substrate 12.

With continued reference to FIG. 1, an "air over fluid" (A/F) regulator 50 and a flow meter 52 are situated in the flow path for the liquid coating material from the pressurized liquid supply 38 to the liquid inlet 36 of the applicator 16. As a result, the liquid coating material is constrained to flow through the A/F regulator 50 and flow meter 52 in transit from the pressurized liquid supply 38 to the applicator 16. A liquid input of the A/F regulator 50 is coupled by a conduit 51 with a liquid outlet of the pressurized liquid supply 38. Similarly, the A/F regulator 50 has a liquid outlet coupled by a conduit 53 with a liquid input of the flow meter 52, which in turn has a liquid outlet coupled by a conduit 55 with the liquid inlet 36 of the applicator 16.

The A/F regulator 50 controls the fluid pressure of the pressurized liquid material in transit in the fluid path to the applicator 16. The controller 18 is electrically coupled by a communication link 57 with a regulator 54. In one embodiment, the regulator 54 may be a "voltage over pressure" (E/P) regulator that receives a control voltage from the motion controller 26 and includes a transducer that converts the control voltage to a fluid pressure. Alternatively, the regulator 54 may receive a control current or a serial communications signal, instead of a control voltage, for conversion to a fluid pressure. The regulator 54 delivers pressurized fluid to the A/F regulator 50 for use in controlling the fluid pressure of the liquid coating material flowing through the A/F regulator 50.

The A/F regulator 50 is positioned in a conduit 35 defining a fluid path between the pressurized liquid supply 38 and the flow meter 52. In an alternative embodiment, the flow meter 52 may be positioned in the fluid path between the pressurized liquid supply 38 and the A/F regulator 50 so that the flow meter 52 is upstream from the A/F regulator 50. With this alternative arrangement, the A/F regulator 50 would alter the pressure of the liquid coating material after the liquid coating material has flowed through the flow meter 52.

The controller 18 is electrically coupled by a communication link 59 with the flow meter 52. In response to the flow of liquid coating material from conduit 53 to conduit 55, the flow meter 52 generates a string of counts or electrical pulses each representing a fixed volume of liquid coating material flowing through or past the flow meter 52. Alternatively, the string of electrical pulses from the flow meter 52 may be communicated from the flow meter to the motion controller 26 and then relayed from the motion controller 26 to the controller 18. In one embodiment, the flow meter 52 may comprise a gear meter that rotates in response to flow through the gear meter and, for a fixed amount of rotation representing a known volume, generates an electrical pulse with an encoder that is transmitted as an electrical signal in a signal stream to the controller 18. For example, the gear meter may generate a pulse for every 0.04 cubic centimeters of liquid coating material flowing through the flow meter 52. In another embodiment, the flow meter 52 may comprise a thermal mass flow meter.

In use and with reference to FIG. 1, the controller 18 obtains a coating program for the substrate 12 when substrate 12 is properly positioned relative to the applicator 16. The coating program determines which components and/or areas of the substrate 12 are to be coated with liquid coating material, which is usually applied in strips. For example, possibly twenty-five separate components or areas of a substrate 12 may be coated with strips of the liquid coating material. The controller 18 retrieves an operational sequence from the memory 44 of controller 18 and, in turn, communicates control signals to the motion controller 26 over communication link 25 representing the operational sequence. The motion controller 26 sends command signals to the robot 14 over communication link 21 that instruct the robot 14 to move the applicator 16 at specified velocities to desired locations with respect to the substrate 12. The motion controller 26 controls the movements of the robot 14 to move the applicator 16 in a plane (e.g., X and Y directions) across the substrate 12, opening and closing the dispensing valve in the applicator 16 as necessary during this movement to apply the liquid coating material to the desired components and areas of the substrate 12.

Specifically, at any particular location on substrate 12, the motion controller 26 also provides a command signal to the solenoid 34 to cause it to change state to open the dispensing valve causing discharge of liquid coating material from nozzle 31. Concurrently, the motion controller 26 provides command signals to the robot 14 to initiate motion of applicator 16 relative to the substrate 12. The stream 42 of liquid coating material may be optionally manipulated by an assist fluid, such as air, that affects the shaping of the stream 42 discharged from the applicator 16. After a predetermined time lapses, the motion controller 26 subsequently changes the state of the valve command signal to return the solenoid 34 back to its original state. This action closes the dispensing valve to discontinue the discharge of liquid coating material from the nozzle 31 of the applicator 16. The motion controller 26 may cause the dispensing valve of the applicator 16 to open and close the dispensing valve multiple times (e.g., twenty-five times) during the extent of the coating program so that multiple components and areas of the substrate 12 receive an amount of liquid coating material.

During the coating program or in preparation for the execution of the coating program, the controller 18 provides electrical signals to the motion controller 26, which prompt the motion controller 26 to provide command signals to the regulator 54. The regulator 54 controls an air pressure supplied to the A/F regulator 50 to selecting a liquid pressure for the pressurized liquid coating material flowing from the pressurized liquid supply 38 to the applicator 16. The selected value of liquid pressure, which is dispensing application dependent, may further depend on the desired flow rate of the liquid coating material. The flow rate for the liquid coating material is influenced, among other factors, by the liquid pressure, the diameter of the discharge orifice in the dispensing nozzle 31, the material viscosity, etc.

Figure 2:
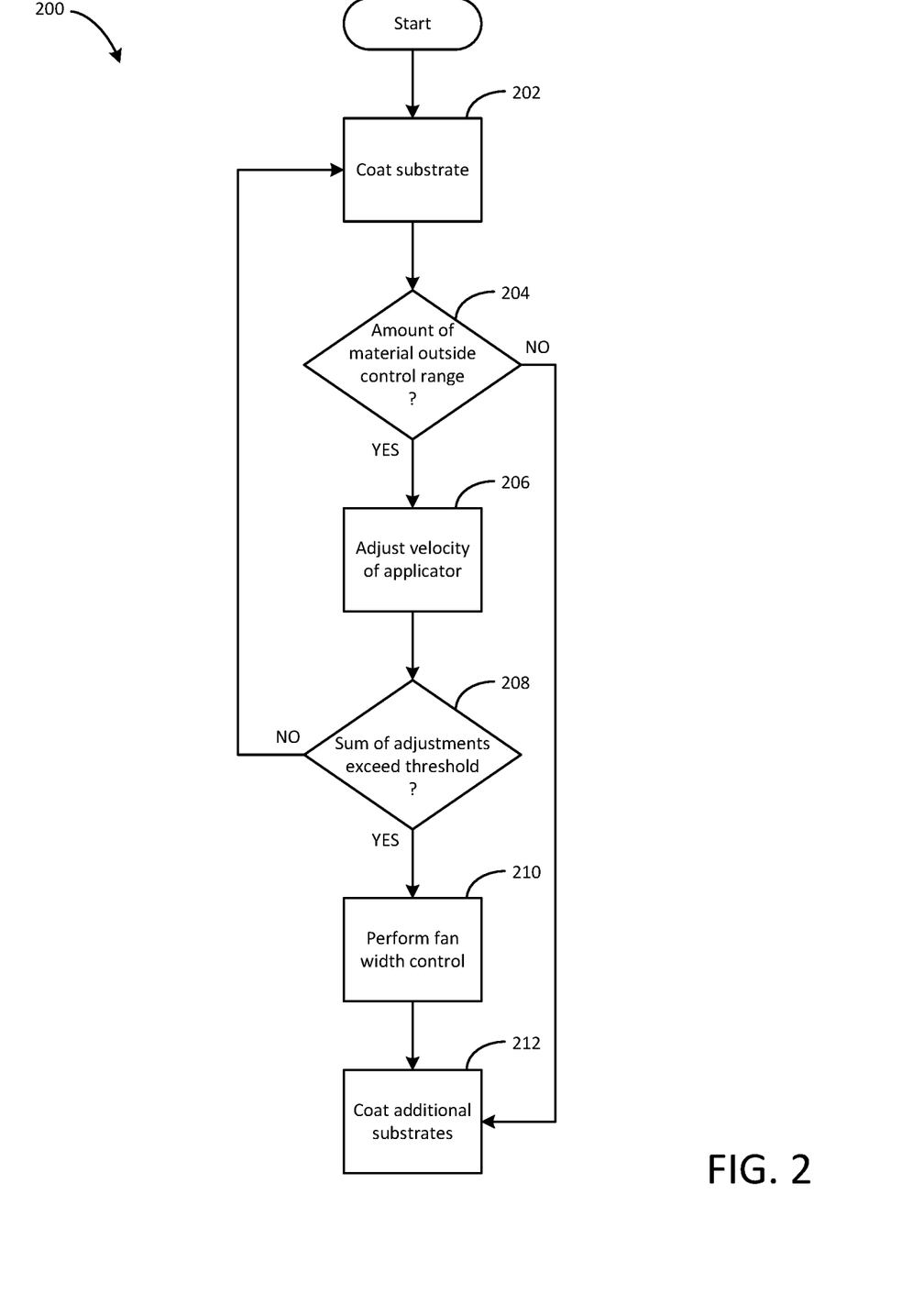
FIG. 2 illustrates a flow diagram of an exemplary method in accordance with an embodiment.

FIG. 2 illustrates a flow diagram of an exemplary process 200 of coating one or more substrates 12 with a material, such as a liquid coating material. The process 200 may be executed, at least in part, by the motion controller 26 and/or controller 18. Generally, the process 200 may include a flow control routine (steps 202-208) iteratively adjusting the velocity of the applicator 16 or other parameter affecting the amount of material applied to the substrate 12. When the sum of the adjustments by the flow control routine exceed a predetermined threshold (step 208), which may be indicative of the fan width of the dispensed material having changed, a fan width control routine (step 210) may thereby adjust the fan width to conform to a specified standard.

At step 202, a substrate 12, or portion thereof, may be coated with the material. As the substrate 12 is coated with the material, the amount of material may be measured. For example, as the material flows from the pressurized liquid supply 38 and out the applicator 16, the flow meter 52 may transmit to the controller 18 a count or electrical pulse for each fixed amount of material passing through the flow meter 52. As another example, the amount of material applied to the substrate may be measured according to a differential in the weight of the remaining material in the pressurized liquid supply 38. The amount of material may be measured as a volume of material and/or a weight of the material.

At step 204, it may be determined whether the amount of material dispensed in step 202 is outside or within a predetermined control range. In some embodiments, it may be determined that the amount of the material dispensed in step 202 is within an inner predetermined control range that is, for example, ±1% of the desired amount to be dispensed. For example, it may be determined that too much or too little material was applied to the substrate 12. In one aspect, it may be determined whether the volume of the material is outside or within a predetermined volume control range. In another aspect, it may be determined whether the weight of the material is outside or within a predetermined weight control range. If the amount of the material is outside the predetermined control range, the process 200 may proceed to step 206.

In one embodiment, the amount of material dispensed in step 202 may be compared against an outer predetermined control range, wherein the outer predetermined control range is broader in at least some respect than the predetermined control range (e.g., the predetermined control range is a subset of the outer predetermined control range). For example, the outer predetermined control range may be ±10% of the desired amount to be dispensed. If the amount of material is outside of the outer predetermined control range, a stop signal may be generated to stop the dispensing of the material or an indication that the amount of material is outside of the outer predetermined control range may be generated and communicated, such as via a display of other visual indicator of the HMI device 19, to an operator. In an aspect, the indication may comprise an audio alert generated by the HMI device 19.

At step 206, the velocity of the applicator 16 relative to the substrate may be adjusted according to the determination that the amount of material is outside of the predetermined control range, and optionally, the degree to which the amount of material is outside of the predetermined control range. As will be appreciated by one skilled in the art, with all other relevant factors (e.g., flow rate) being constant, adjusting the velocity that the applicator 16 moves while applying the material will correspondingly adjust the amount of material applied to the substrate 12. As an example, if it is determined that the amount of material applied to the substrate 12 in step 202 exceeds the upper limit of the predetermined control range by a certain amount, the velocity of the applicator 16 may be increased to dispense material in a reduced amount corresponding to the certain amount by which the upper limit of the predetermined control range was exceeded.

In some embodiments, one or more other parameters affecting the amount of material applied to the substrate 12 may additionally or alternatively be adjusted. In an aspect, the pulse rate of the applicator 16 may be adjusted. If the pulse rate of the applicator 16 is increased, for example, more material will be applied to the substrate 12. In another aspect, the temperature of the material may be adjusted. For example, the temperature of the material may be adjusted by operation of the temperature controller 60 and heating elements 38a disposed in the pressurized liquid supply 38, by operation of a heating element disposed in one of the conduits 53, 53, 55, and/or by operation of a heating element in the applicator 16. As the viscosity of the material may be affected by temperature and the flow rate of the material may be affected by the viscosity, it follows that the amount of material dispensed from the applicator 16, and thus applied to the substrate 12, may be affected by the temperature of the material.

As the velocity of the applicator 16 or other parameter affecting the amount of material is adjusted in each iteration of the flow control routine, a sum of the adjustments may be determined and stored, such as by the controller 18 and/or memory 44. The sum of the adjustments, in one aspect, may be the sum of the absolute amount or degree of adjustments thus far in the flow control routine. For example, in an embodiment in which the temperature of the material is adjusted to affect the amount of material applied, the sum of adjustments may comprise the running total of degrees by which the temperature was adjusted (either raised or lowered) in the flow control routine. In another aspect, the sum of adjustments may comprise the number of times in the flow control routine that the parameter affecting the amount of material is adjusted, irrespective of the amount or degree to which the parameter is adjusted.

At step 208, the sum of adjustments to the velocity of the applicator 16 or other parameter affecting the amount of material applied to the substrate 12 is compared to a predetermined threshold. The predetermined threshold may correspond to a value at which it may be inferred that the fan width of the material dispensed from the applicator 16 may have changed and requires adjustment. If the sum of adjustments does not exceed the predetermined threshold, another iteration of the flow control routine may be initiated at step 202. If the sum of adjustments does exceed the predetermined threshold, a fan width control routine may be initiated.

At step 210, a fan width control routine may be invoked to adjust the fan width of the material dispensed from the applicator 16. For example, the width and/or shape of the fan may be determined, such as via the fan width sensor 62, and compared to a predetermined fan width control range. If the width and/or shape of the fan are outside the predetermined fan width control range, the width and/or shape of the fan may be adjusted accordingly to bring the width and/or shape of the fan within the predetermined fan width control range. The width and/or shape of the fan may be adjusted, for example, by interaction with an assist fluid, such as air, supplied from the pressurized fluid supply 32 and regulated by the fluid regulator 43. The fan width control routine may include a single adjustment to the fan or may include an iterative process in which successive comparisons of the fan to the predetermined fan width control range and corresponding adjustments are performed.

In some aspects, the pressure of the material supplied to the applicator 16 may be adjusted, which in turn, may affect the width and/or shape of the fan. For example, under command of the controller 18, the operation of the pump of the pressurized liquid supply 38 may be adjusted to increase or decrease the pressure of the material supplied to the applicator 16. In another aspect, the relative position and/or distance between the substrate 12 and the applicator 16 may be adjusted to alter the width and/or shape of the fan of material dispensed from the applicator 16. For example, the controller 18 and/or motion controller 26 may direct the robot 14 to position the applicator 16 at an increased distance from the substrate 12, thus increasing the width of the fan of material at the point of contact with the substrate 12. In yet another aspect, the shape and/or size of the dispensing orifice in the nozzle 31 may be adjusted to affect the shape and/or width of the fan of the material passing through the dispensing orifice.

Further, the flow control routine of steps 202-208 and/or the fan width control routine of step 210 may be additionally repeated one or more times to iteratively compensate for any variations in flow rate and/or amount of material applied to the substrate 12 caused by the fan width control routine of step 210. For example, if an adjustment to the pressure of the material was made in the preceding fan width control routine of step 210, the subsequent flow rate and/or amount of material applied to the substrate 12 may be rechecked and, if necessary (e.g., is outside of a predetermined control range), adjusted. A further fan width control routine of step 210 may be subsequently performed. This iterative process may be continued until both the flow rate and/or amount of material applied to the substrate 12 and the fan width and/or shape of the fan are within the respective predetermined control ranges.

Upon completion of the fan width control routine, at step 212, additional substrates 12 may be coated with the material according to the adjustments made in the process 200. The process 200 may be considered an iterative process. For example, as additional substrates 12 are coated in step 212, this may also be considered as restarting the process 200 at step 202, whereby the flow control routine of steps 202-208 may continue to iteratively adjust the velocity of the applicator 16 as it coats the additional substrates 12, and so forth.

Figure 3:
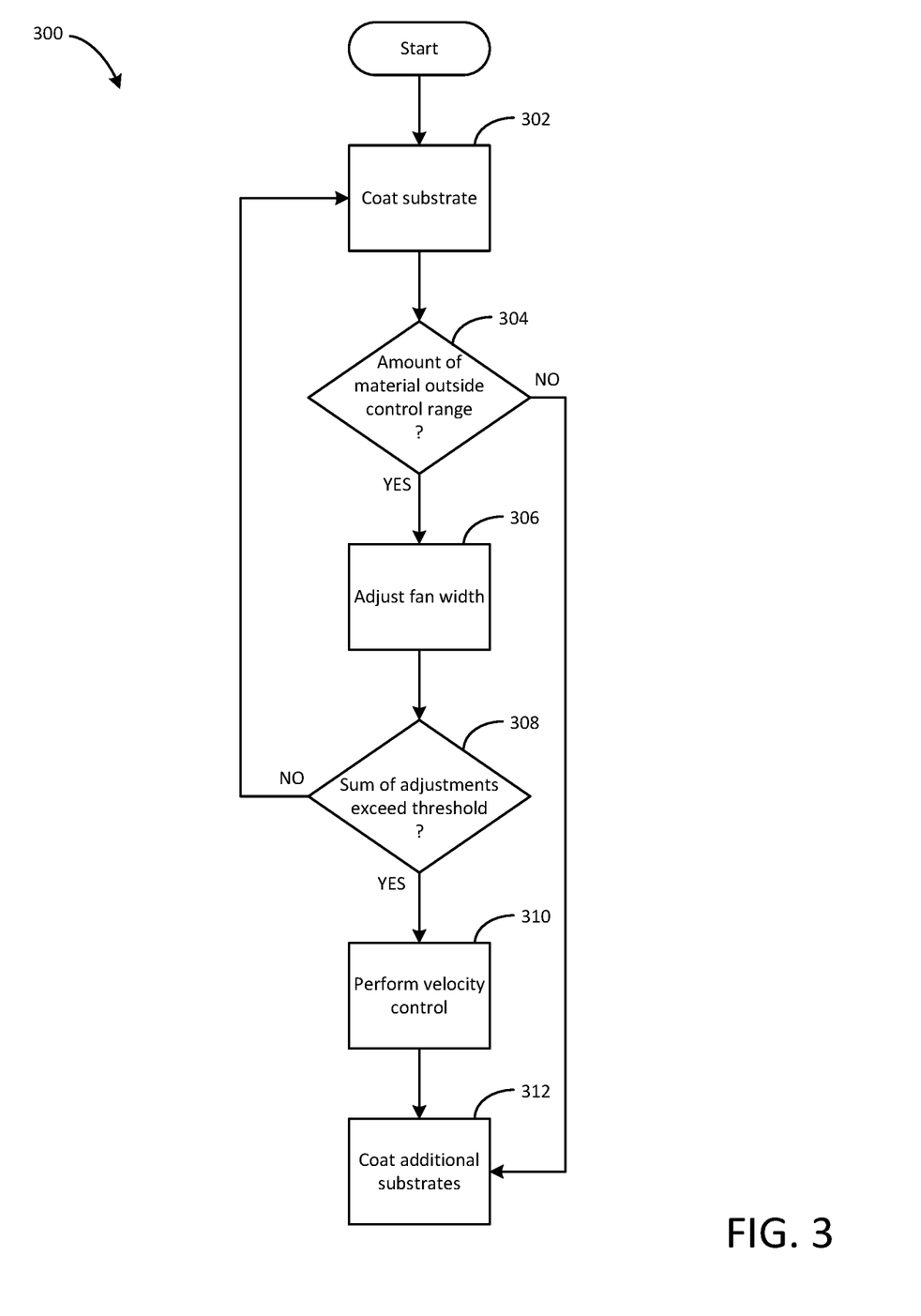
FIG. 3 illustrates a flow diagram of an exemplary method in accordance with an embodiment.

FIG. 3 illustrates a flow diagram of an exemplary process 300 of coating one or more substrates 12 with a material, such as a liquid coating material. The process 300 may be executed, at least in part, by the motion controller 26 and/or controller 18. By way of introduction, the process 300 may include a fan width control routine (steps 302-308), wherein the fan width of the material dispensed by the applicator 16, or other parameter affecting the fan width, is iteratively adjusted. When the sum of the adjustments in the fan width control routine exceed a predetermined threshold (step 308), which may indicate that the amount of material dispensed and applied to the substrate 12 has changed, a flow control routine (step 310) may be initiated to adjust the velocity of the applicator 16 or other parameter relating to the amount of material dispensed and applied to the substrate 12.

At step 302, a substrate 12, or portion thereof, may be coated with the material and the amount of material may be measured. For example, the flow meter 52 may measure the amount of material passing from the pressurized liquid supply 38 to the applicator 16 and transmit the measured amount to the controller 18 for processing and storage. The amount of material may be measured by volume or weight.

At step 304, whether the amount of material applied to the substrate 12 in step 302 is outside or within a predetermined control range may be determined, such as by the controller 18. In some embodiments, it may be determined that the amount of the material dispensed in step 302 is within an inner predetermined control range that is, for example, be ±1% of the desired amount to be dispensed. For example, it may be determined that too much material was applied to the substrate 12 or that too little material was applied to the substrate 12. In one aspect, it may be determined whether the volume of the material is outside or within a predetermined volume control range. In another aspect, it may be determined whether the weight of the material is outside or within a predetermined weight control range. If the amount of the material is outside the predetermined control range, the process 300 may proceed to step 306.

In one embodiment, the amount of material dispensed in step 302 may be compared against an outer predetermined control range, wherein the outer predetermined control range is broader in at least some respect than the predetermined control range (i.e., the predetermined control range is a subset of the outer predetermined control range). For example, the outer predetermined control range may be ±10% of the desired amount to be dispensed. If the amount of material is outside of the outer predetermined control range, a stop signal may be generated to stop the dispensing of the material or an indication that the amount of material is outside of the outer predetermined control range may be generated and communicated, such as via the HMI device 19, to an operator.

At step 306, the fan width of the material dispensed from the applicator 16 may be adjusted based on the determination that the amount of material is outside the predetermined control range, and optionally, the degree to which the amount of material is outside the predetermined control range. In an aspect, the fan width may be adjusted by adjusting the pressure of the material supplied to the applicator 16. For example, under command of the controller 18, the operation of the pump of the pressurized liquid supply 38 may be adjusted to increase or decrease the pressure of the material supplied to the applicator 16. In another aspect, the relative position and/or distance between the substrate 12 and the applicator 16 may be adjusted to alter the width and/or shape of the fan of material dispensed from the applicator 16. For example, the controller 18 and/or motion controller 26 may direct the robot 14 to position the applicator 16 at an increased distance from the substrate 12, thus increasing the width of the fan of material at the point of contact with the substrate 12. In yet another aspect, the shape and/or size of the dispensing orifice in the nozzle 31 may be adjusted to affect the shape and/or width of the fan of the material passing through the dispensing orifice.

As the fan width of the material dispensed from the applicator 16, or other parameter affecting the fan width, is adjusted in each iteration of the fan width control routine, the sum of the adjustments may be determined and stored, such as by the controller 18 and/or memory 44. The sum of the adjustments, in one aspect, may be the sum of the absolute amount or degree of adjustments thus far in the fan width control routine. In another aspect, the sum of adjustments may comprise the number of times in the fan width control routine that the parameter affecting the fan width is adjusted, irrespective of the amount or degree to which the parameter is adjusted.

At step 308, the sum of the adjustments to the fan width or other parameter affecting the fan width is compared to a predetermined threshold. The predetermined threshold may correspond to a value at which the amount of material applied to the substrate 12 may require adjustment. In one aspect, the predetermined threshold may correspond to a value at which the thickness of the material applied to the substrate 12 may require adjustment. For example, if the width of the fan was increased in the fan width control routine without a corresponding increase in the flow of the material (i.e., the amount of material) to the applicator 16 or a decrease in the velocity of the applicator 16, the thickness of the coating of material on the substrate 12 may not be as thick as desired. Accordingly, the flow of the material may need to be increased and/or the velocity of the applicator 16 may need to be decreased to provide the desired coating thickness. If the sum of adjustments does not exceed the predetermined threshold, another iteration of the fan width control routine may be initiated at step 302. If the sum of adjustments does exceed the predetermined threshold, a flow control routine may be initiated.

At step 310, a flow control routine may be initiated to adjust the velocity of the applicator 16 or other parameter affecting the amount and/or thickness of material applied to the substrate 12. Other parameters affecting the amount and/or thickness of material applied to the substrate 12 may include a pulse rate of the applicator 16 or the temperature of the material. The flow control routine may include a comparison of the amount and/or thickness of material applied to the substrate 12 with a predetermined control range. According to the comparison, the velocity of the applicator 16, the pulse rate of the applicator 16, the temperature of the material, and/or other parameter relating to the amount and/or thickness of material to the substrate 12 may be adjusted. The flow control routine may include a single adjustment or may include an iterative process in which successive comparisons of the amount and/or thickness of material to the predetermined control range and corresponding adjustments are performed.

Upon completion of the flow control routine, at step 312, additional substrates 12 may be coated with the material according to the adjustments made in the process 300. The process 300 may be considered an iterative process. For example, as additional substrates 12 are coated in step 312, this may also be considered as restarting the process 300 at step 302, whereby the fan width control routine of steps 302-308 may continue to iteratively adjust the fan width, and so forth.

Figure 4:
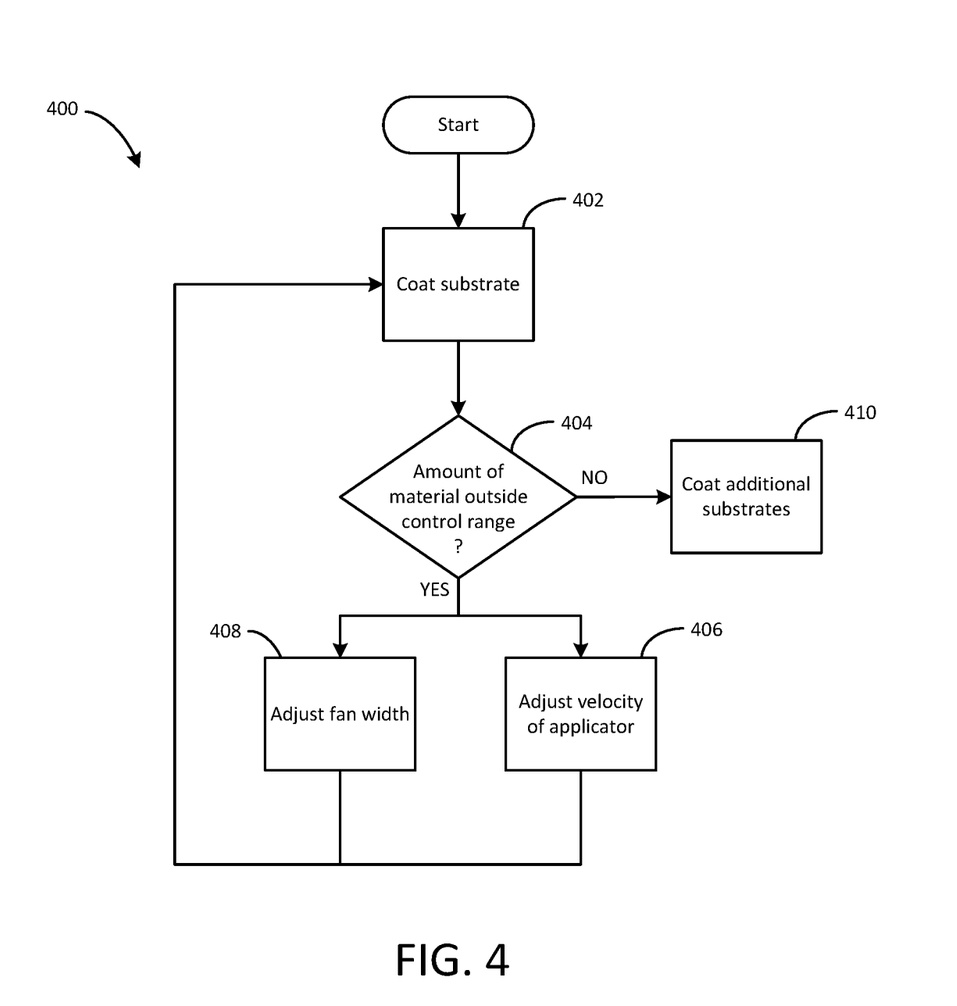
FIG. 4 illustrates a flow diagram of an exemplary method in accordance with an embodiment.

FIG. 4 illustrates a flow diagram of an exemplary process 400 of coating one or more substrates 12 with a material, such as a liquid coating material. The process 400 may be executed, at least in part, by the motion controller 26 and/or controller 18. By way of introduction, the process 400 may include combined fan width and flow control routine (steps 402-406) wherein the fan width of the material dispensed by the applicator 16, or other parameter affecting the fan width, and the amount and/or thickness of the material applied to the substrate 12 are simultaneously and iteratively adjusted.

At step 402, a substrate 12, or portion thereof, may be coated with the material and the amount of material may be measured. For example, the flow meter 52 may measure the amount of material passing from the pressurized liquid supply 38 to the applicator 16 and transmit the measured amount to the controller 18 for processing and storage. The amount of material may be measured by volume or weight.

At step 404, it may be determined, such as by the controller 18, whether the amount of material applied to the substrate 12 is outside or within a predetermined control range. In some embodiments, it may be determined that the amount of the material dispensed in step 402 is within an inner predetermined control range that is, for example, ±1% of the desired amount to be dispensed. If the amount of the material is within (i.e., not outside) the predetermined control range, the process may proceed to step 410 and additional substrates 12 may be coated.

In some embodiments, it may be determined that too much or too little material was applied to the substrate 12. In one aspect, it may be determined whether the volume of the material is outside or within a predetermined volume control range. In another aspect, it may be determined whether the weight of the material is outside or within a predetermined weight control range. If the amount of the material is outside the predetermined control range, the process 400 may proceed to steps 406 and 408.

In one embodiment, the amount of material dispensed in step 402 may be compared against an outer predetermined control range, wherein the outer predetermined control range is broader in at least some respect than the predetermined control range (e.g., the predetermined control range is a subset of the outer predetermined control range). For example, the outer predetermined control range may be ±10% of the desired amount to be dispensed. If the amount of material is outside of the outer predetermined control range, a stop signal may be generated to stop the dispensing of the material or an indication that the amount of material is outside of the outer predetermined control range may be generated and communicated, such as via the HMI device 19, to an operator.

At step 406, a flow control routine may be invoked in which the velocity of the applicator 16 or other parameter affecting the amount and/or thickness of material applied to the substrate 12 may be adjusted. Other parameters affecting the amount and/or thickness of material applied to the substrate 12 may include a pulse rate of the applicator 16 or the temperature of the material. The flow control routine may include a comparison of the amount and/or thickness of material applied to the substrate 12 with a predetermined control range. According to the comparison, the velocity of the applicator 16, the pulse rate of the applicator 16, the temperature of the material, and/or other parameter relating to the amount and/or thickness of material to the substrate 12 may be adjusted. The flow control routine may include a single adjustment or may include an iterative process in which successive comparisons of the amount and/or thickness of material to the predetermined control range and corresponding adjustments are performed.

At step 408, which may occur concurrently with step 406, a fan width control routine may be invoked in which the fan width or other parameter affecting the fan width may be adjusted. The fan width control routine may include a comparison of the width and/or shape of the fan of material dispensed from the applicator 16 with a predetermined fan width control range. If the width and/or shape of the fan are outside the predetermined fan width control range, the width and/or shape of the fan may be adjusted accordingly to bring the width and/or shape of the fan within the predetermined fan width control range. The fan width control routine may include a single adjustment to the fan or may include an iterative process in which successive comparisons of the fan to the predetermined fan width control range and corresponding adjustments are performed.

Upon completion of the flow control routine of step 406 and the fan width control routine of step 408, the process 400 may return to step 402 and additional iterations of steps 402, 404, 406, and 408 may be repeated with additional substrates 12, or portions thereof, until the amount of material applied to the respective substrate 12 is not outside the predetermined control range in step 404, upon which the process may proceed to step 410. In some aspects, the process 400 may return to step 402 and additional iterations of steps 402, 404, 406, 408 may be performed with respect to the same substrate 12, or portions thereof, before proceeding to coat additional substrates 12. By adjusting both the velocity of the applicator 16 and the fan width, the adjustment of each parameter will be relatively less than the adjustment of a single parameter to achieve the same changes in amount of the material dispensed. At step 410, additional substrates 12 may be coated according to the various adjusted parameters of steps 406 and 408.

Figure 5:
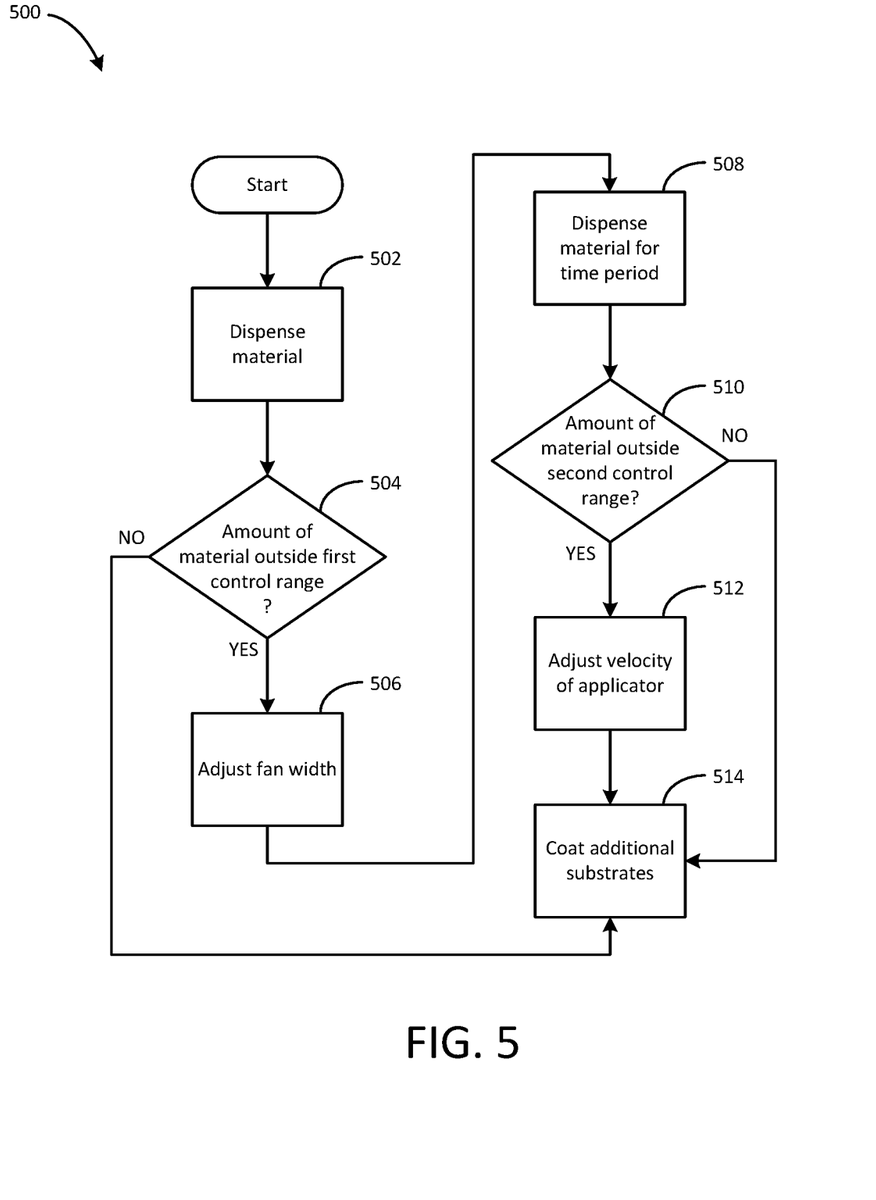
FIG. 5 illustrates a flow diagram of an exemplary method in accordance with an embodiment.

FIG. 5 illustrates a flow diagram of an exemplary process 500 of coating one or more substrates 12 with a material. The process 500 may be executed, at least in part, by the motion controller 26 and/or controller 18. The process 500 may be used as a calibration method. By way of introduction, the process 500 may include a fan width control routine (steps 502-506) in which the fan width of the material, or other parameter affecting the fan width, is adjusted. Following the fan width control routine, the material may be dispensed for a predetermined period of time (step 508) and a flow control routine (steps 508-512) may be invoked, in which the velocity of the applicator 16, or other parameter affecting the amount of material dispensed, is adjusted.

At step 502, a material is dispensed from the applicator 16. For example, a substrate 12, or portion thereof, may be coated with the material. In another example, the material may be dispensed in a waste bin as part of a calibration routine. As the substrate 12 is coated with the material, the amount of material may be measured. The amount of material may be measured by weight or by volume.

At step 504, it may be determined whether the amount of material applied to the substrate 12 in step 502 is outside or within a first predetermined control range. In some embodiments, it may be determined that the amount of the material dispensed in step 502 is within an inner predetermined control range that is, for example, be ±1% of the desired amount to be dispensed. If the amount of material is outside the first predetermined control range, the process 500 may proceed to step 506.

In one embodiment, the amount of material dispensed in step 502 may be compared against a first outer predetermined control range, wherein the first outer predetermined control range is broader in at least some respect than the first predetermined control range (e.g., the first predetermined control range is a subset of the first outer predetermined control range). For example, the first outer predetermined control range may be ±10% of the desired amount to be dispensed. If the amount of material is outside of the first outer predetermined control range, a stop signal may be generated to stop the dispensing of the material or an indication that the amount of material is outside of the first outer predetermined control range may be generated and communicated, such as via the HMI device 19, to an operator.

At step 506, the fan width of the material dispensed from the applicator 16 may be adjusted based on the determination that the amount of material is outside the first predetermined control range, and optionally, the degree to which the amount of material is outside the first predetermined control range. In an aspect, the fan width may be adjusted by adjusting the pressure of the material supplied to the applicator 16. In another aspect, the relative position and/or distance between the substrate 12 and the applicator 16 may be adjusted to alter the width and/or shape of the fan of material dispensed from the applicator 16. In yet another aspect, the shape and/or size of the dispensing orifice in the nozzle 31 may be adjusted to affect the shape and/or width of the fan of the material passing through the dispensing orifice.

At step 508, material may be dispensed from the applicator 16 for a predetermined period of time. As the material is dispensed during the predetermined period of time, the amount of material may be measured, such as by weight or volume.

At step 510, it may be determined whether the amount of material dispensed in step 508 is outside or within a second predetermined control range. If the amount of material is outside the second predetermined control range, the process 500 may proceed to step 512.

In one embodiment, the amount of material dispensed in step 508 may be compared against a second outer predetermined control range, wherein the second outer predetermined control range is broader in at least some respect than the second predetermined control range (e.g., the second predetermined control range is a subset of the second outer predetermined control range). For example, the second outer predetermined control range may be ±10% of the desired amount to be dispensed. If the amount of material is outside of the second outer predetermined control range, a stop signal may be generated to stop the dispensing of the material or an indication that the amount of material is outside of the second outer predetermined control range may be generated and communicated, such as via the HMI device 19, to an operator.

At step 512, the velocity of the applicator 16, or other parameter affecting the amount of material dispensed, may be adjusted based on the determination that the amount of material is outside the second predetermined control range, and optionally, the degree to which the amount of material is outside the second predetermined control range. Other parameters affecting the amount and/or thickness of material applied to the substrate 12 may include a pulse rate of the applicator 16 or the temperature of the material.

At step 514, one or more additional substrates 12, or portions thereof, may be coated. To the extent that process 500 may be used as a calibration method prior to beginning a "production" process of coating substrates 12, the substrate 12 coated in step 502 may comprise a test substrate 12, while the additional substrates 12 coated in step 514 may comprise "production" substrates 12 (e.g., those substrates 12 that are intended to be sold or included in a manufactured product).

Figure 6:
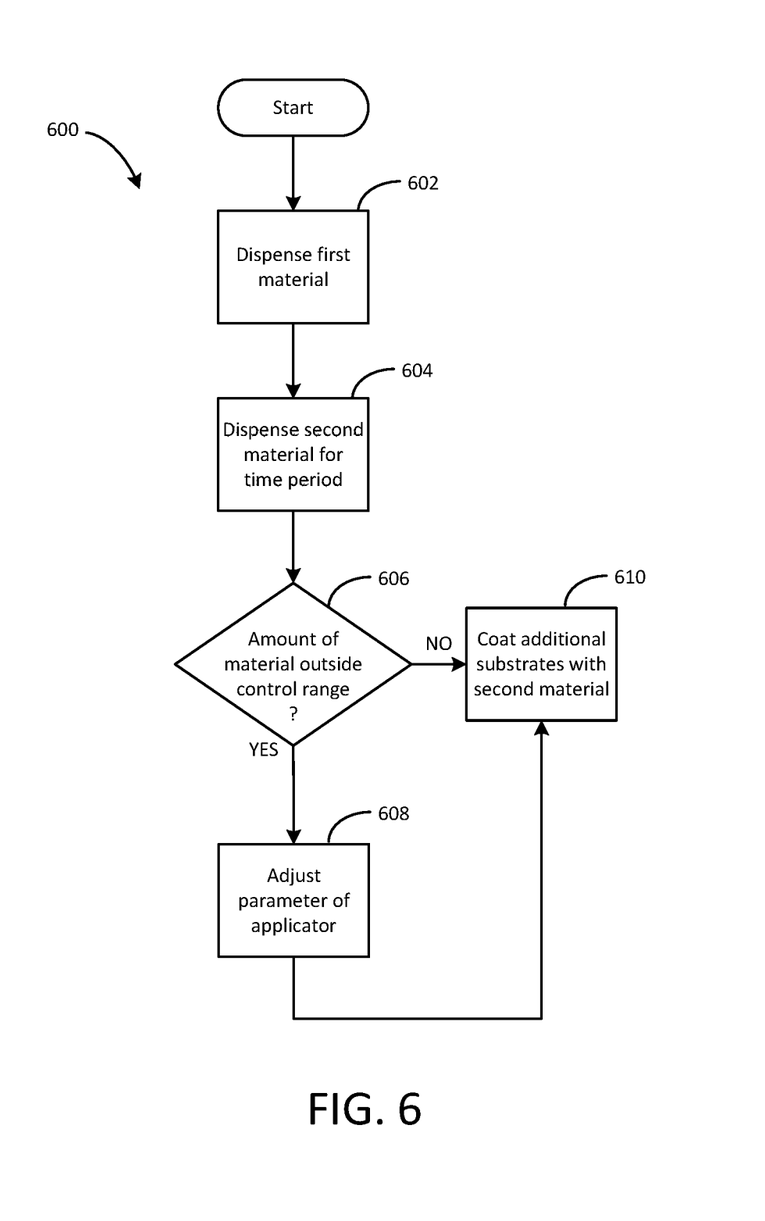
FIG. 6 illustrates a flow diagram of an exemplary method in accordance with an embodiment.

FIG. 6 illustrates a flow diagram of an exemplary process 600 of coating one or more substrates 12 with a material. The process 600 may be executed, at least in part, by the motion controller 26 and/or controller 18. The process 600 may be used as a calibration method, such as when the dispensed material is being changed from a first material to a second material (i.e., a material changeover). Initially, at step 602 a first material is dispensed from the applicator 16. For example a first substrate 12 is coated with a first material according to a first pulse rate, a first temperature of the material, a first pressure of the material supplied to the applicator, and a first fan width. In another example, the first material may be dispensed in a waste bin as part of a calibration routine. A second, different material is then received.

At step 604, the second material may be dispensed from the applicator 16 for a predetermined period of time. As the second material is dispensed during the predetermined period of time, the amount of material may be measured, such as by weight or volume.

At step 606, it may be determined whether the amount of the second material dispensed in step 604 is outside or within a predetermined control range. If the amount of material is outside the predetermined control range, the process 600 may proceed to step 608.

In one embodiment, the amount of the second material dispensed in step 604 may be compared against an outer predetermined control range, wherein the outer predetermined control range is broader in at least some respect than the predetermined control range (e.g., the predetermined control range is a subset of the outer predetermined control range). For example, the outer predetermined control range may be ±10% of the desired amount to be dispensed. If the amount of the second material is outside of the outer predetermined control range, a stop signal may be generated to stop the dispensing of the second material or an indication that the amount of the second material is outside of the outer predetermined control range may be generated and communicated, such as via the HMI device 19, to an operator.

At step 608, a parameter affecting the amount of the second material dispensed, may be adjusted based on the determination that the amount of the second material is outside the predetermined control range, and optionally, the degree to which the amount of the second material is outside the predetermined control range. The parameters affecting the amount and/or thickness of material applied to the substrate 12 may include a velocity of the applicator 16, a pulse rate of the applicator 16, a temperature of the second material, a pressure of the second material supplied to the applicator 16, or a first fan width of the applicator.

At step 610, one or more additional substrates 12, or portions thereof, may be coated with the second material according to the adjusted parameters. To the extent that process 600 may be used as a calibration method prior to beginning a "production" process of coating substrates 12, the substrate 12 coated in step 604 may comprise a test substrate 12, while the additional substrates 12 coated in step 610 may comprise "production" substrates 12 (e.g., those substrates 12 that are intended to be sold or included in a manufactured product).

While the disclosure has been described in connection with the various embodiments of the various figures, it is to be understood that other similar embodiments can be used or modifications and additions can be made to the described embodiments. Therefore, the methods and systems as described herein should not be limited to any single embodiment, but rather should be construed in breadth and scope in accordance with the appended claims.

What is claimed is:

1. A method of calibrating a coating system, the method comprising:
   dispensing a material using an applicator of the coating system for a predetermined time period;
   determining a characteristic of the dispensing of the material for the predetermined time period, including determining a fan width of the dispensing of the material using a fan width sensor that includes a camera and a light or laser source;
   comparing the characteristic of the dispensing of the material to a predetermined range;
   determining, in response to the comparison of the characteristic of the dispensing of the material to the predetermined range, that the characteristic of the dispensing of the material is outside of the predetermined range; and
   adjusting, in response to the determination that the characteristic of the dispensing of the material is outside of the predetermined range, a velocity of the applicator, a pulse rate of the applicator, a temperature of the material, a pressure of the material supplied to the applicator, or a fan width of the applicator to change the characteristic of the dispensing of the material,
   wherein determining the fan width includes positioning a stream of the material dispensed from the applicator between the camera and the light or laser source.

2. The method of claim 1, wherein adjusting the velocity of the applicator, the pulse rate of the applicator, the temperature of the material, the pressure of the material supplied to the applicator, or the fan width of the applicator to change the fan width of the dispensing of the material comprises adjusting the pressure of the material supplied to the applicator or the fan width of the applicator to change the fan width of the dispensing of the material.

3. The method of claim 1, wherein determining the characteristic of the dispensing of the material for the predetermined time period comprises determining a fan shape of the dispensing of the material using a fan width sensor.

4. The method of claim 3, wherein determining the fan shape of the dispensing of the material using the fan width sensor comprises positioning a stream of the material dispensed from the applicator between the camera and the light or laser source.

5. The method of claim 3, wherein adjusting the velocity of the applicator, the pulse rate of the applicator, the temperature of the material, the pressure of the material supplied to the applicator, or the fan width of the applicator to change the fan shape of the dispensing of the material comprises adjusting the pressure of the material supplied to the applicator or the fan width of the applicator to change the fan shape of the dispensing of the material.

6. The method of claim 1, wherein determining the characteristic of the dispensing of the material for the predetermined time period comprises determining a total amount of the material dispensed during the predetermined time period.

7. The method of claim 6, wherein the total amount of the material dispensed during the predetermined time period is determined based on one or more electrical pulses sent from a flow meter, each of the one or more electrical pulses corresponding to a fixed volume of the material passing through the flow meter.

8. The method of claim 6, wherein the total amount of the material dispensed during the predetermined time period comprises a total weight or volume of the material dispensed during the predetermined time period.

9. The method of claim 6, wherein adjusting the velocity of the applicator, the pulse rate of the applicator, the temperature of the material, the pressure of the material supplied to the applicator, or the fan width of the applicator to change the total amount of the material dispensed during the predetermined time period comprises adjusting the velocity of the applicator, the pulse rate of the applicator, the temperature of the material, or the pressure of the material supplied to the applicator to change the total amount of the material dispensed during the predetermined time period.

10. The method of claim 9, wherein adjusting the velocity of the applicator, the pulse rate of the applicator, the temperature of the material, or the pressure of the material supplied to the applicator to change the total amount of the material dispensed during the predetermined time period comprises adjusting the pressure of the material supplied to the applicator to change the total amount of the material dispensed during the predetermined time period.

11. The method of claim 1, wherein dispensing the material using the applicator for the predetermined time period comprises dispensing the material using the applicator into a waste bin or on a test substrate for the predetermined time period.

12. The method of claim 1, wherein adjusting the velocity of the applicator, the pulse rate of the applicator, the temperature of the material, the pressure of the material supplied to the applicator, or the fan width of the applicator comprises receiving a value for the velocity of the applicator, the pulse rate of the applicator, the temperature of the material, the pressure of the material supplied to the applicator, or the fan width of the applicator from a human machine interface.

13. A method of calibrating a coating system, the method comprising:
dispensing a material using an applicator of the coating system for a first predetermined time period;
determining a total amount of the material dispensed during the first predetermined time period;
comparing the total amount of the material dispensed during the first predetermined time period to a first predetermined range;
determining, in response to the comparison of the total amount of the material dispensed during the first predetermined time period to the first predetermined range, that the total amount of the material dispensed during the first predetermined time period is outside of the first predetermined range;
adjusting, in response to the determination that the total amount of the material dispensed during the first predetermined time period is outside of the first predetermined range, a velocity of the applicator, a pulse rate of the applicator, or a temperature of the material;
dispensing the material using the applicator of the coating system after the adjustment for a second predetermined time period;
determining a fan width or a fan shape of the material dispensed during the second predetermined time period;
comparing the fan width or the fan shape of the material dispensed during the second predetermined time period to a second predetermined range;
determining, in response to the comparison of the fan width or the fan shape of the material dispensed during the second predetermined time period to the second predetermined range, that the fan width or the fan shape of the material dispensed during the second predetermined time period is outside of the second predetermined range; and
adjusting, in response to the determination that the fan width or the fan shape of the material dispensed during the second predetermined time period is outside of the second predetermined range, a pressure of the material supplied to the applicator or a fan width of the applicator.

14. The method of claim 13, wherein dispensing the material using the applicator for the first predetermined time period comprises dispensing the material using the applicator into a waste bin or on a test substrate for the first predetermined time period.

15. The method of claim 13, wherein determining the fan width or the fan shape of the material dispensed during the second predetermined time period comprises positioning a stream of the material dispensed from the applicator between a camera and a light or laser source.

16. A method of calibrating a coating system, the method comprising:
dispensing a material using an applicator of the coating system for a first predetermined time period;
determining a fan width or a fan shape of the material dispensed during the first predetermined time period;
comparing the fan width or the fan shape of the material dispensed during the first predetermined time period to a first predetermined range;
determining, in response to the comparison of the fan width or the fan shape of the material dispensed during the first predetermined time period to the first predetermined range, that the fan width or the fan shape of the material dispensed during the first predetermined time period is outside of the first predetermined range;
adjusting, in response to the determination that the fan width or the fan shape of the material dispensed during the first predetermined time period is outside of the first predetermined range, a pressure of the material supplied to the applicator or a fan width of the applicator;
dispensing the material using the applicator of the coating system after the adjustment for a second predetermined time period;
determining a total amount of the material dispensed during the second predetermined time period;
comparing the total amount of the material dispensed during the second predetermined time period to a second predetermined range;
determining, in response to the comparison of the total amount of the material dispensed during the second predetermined time period to the second predetermined range, that the total amount of the material dispensed during the second predetermined time period is outside of the second predetermined range; and
adjusting, in response to the determination that the total amount of the material dispensed during the second predetermined time period is outside of the second predetermined range, a velocity of the applicator, a pulse rate of the applicator, or a temperature of the material.

17. The method of claim 16, wherein determining the fan width or the fan shape of the material dispensed during the first predetermined time period comprises positioning a stream of the material dispensed from the applicator between a camera and a light or laser source.

18. The method of claim 16, wherein dispensing the material using the applicator for the second predetermined time period comprises dispensing the material using the applicator into a waste bin or on a test substrate for the second predetermined time period.

* * * * *